J. HAINES.
Mower.

No. 13,523.

2 Sheets—Sheet 1.

Patented Sept. 4, 1855.

J. HAINES.
Mower.

No. 13,523.

2 Sheets—Sheet 2.

Patented Sept. 4, 1855.

UNITED STATES PATENT OFFICE.

JONATHAN HAINES, OF PEKIN, ILLINOIS.

IMPROVEMENT IN GRASS-HARVESTERS.

Specification forming part of Letters Patent No. 13,523, dated September 4, 1855.

*To all whom it may concern:*

Be it known that I, JONATHAN HAINES, of Pekin, in the county of Tazewell and State of Illinois, have invented certain new and useful Improvements in Mowing-Machines; and I do hereby declare the following to be a full, clear, and exact description of the same, reference being had to the accompanying drawings, making a part thereof, in which—

Figure 1:
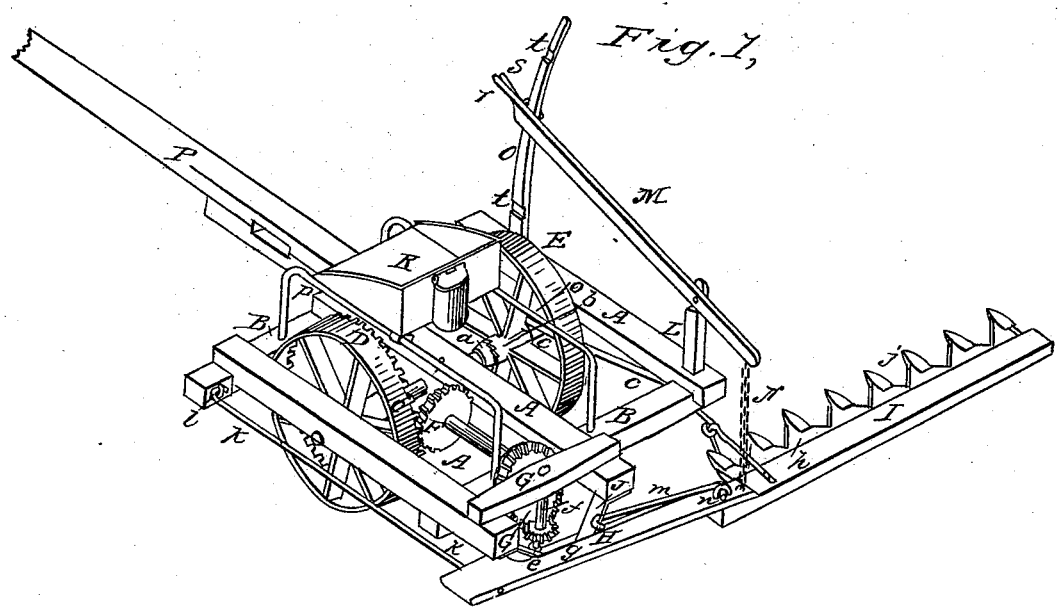
Figure 2:
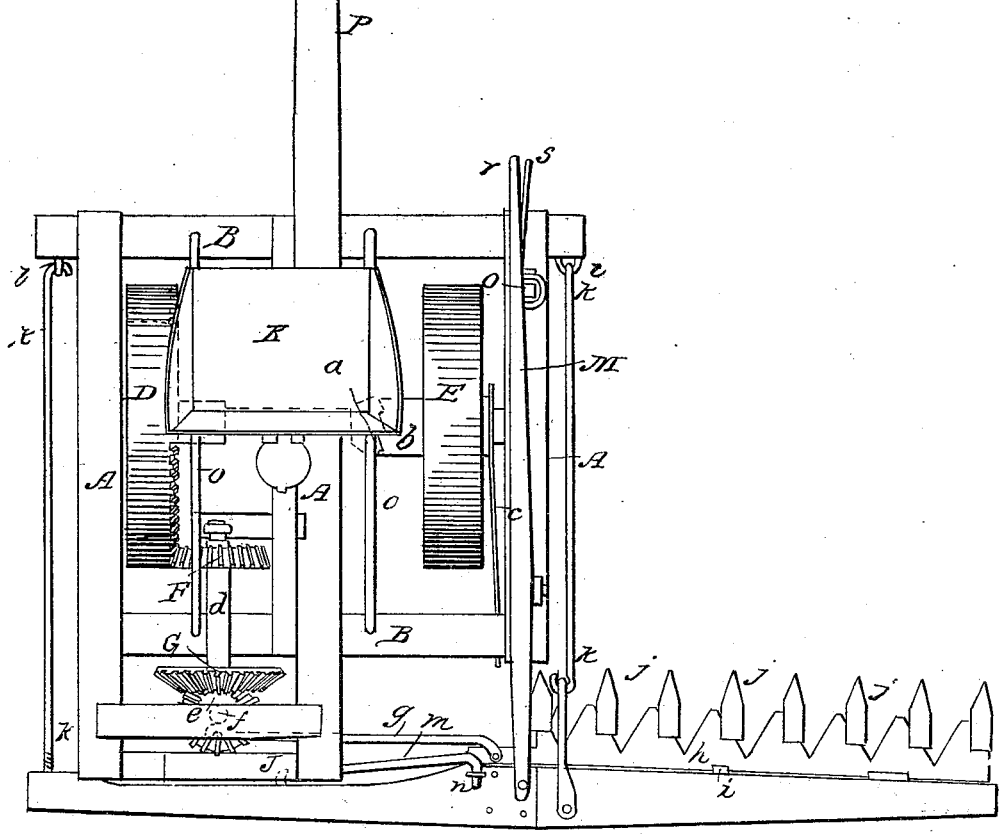

Figure 1 represents a perspective view of the machine. Fig. 2 represents a top plan or "bird's-eye" view.

Similar letters in both the figures refer to like parts.

The nature of my invention relates, first, to the mode of hanging the cutter-bar to the main frame, so as to allow it (the cutter-bar) to follow all the undulations of the ground regardless of the rising or falling of the frame, but so as always to preserve its parallelism with regard to the frame; also, in the combination, with a harvesting-machine, of an instantaneous and constantly - adjustable driver's seat, which can be moved forward or back at pleasure and at all times, for the purpose of placing the weight of the driver on any part of the machine, forward or back, to cause his weight to aid in holding the cutters to their work or to relieve them at any time.

To enable others skilled in the art to make and use my invention, I will proceed to describe the same with reference to the drawings.

A rectangular frame is first made of three longitudinal pieces, A A A, and two cross-pieces, B B, which is supported on the journals of an axle, C, provided with two driving-wheels, D E. One of these wheels, D, is fast on said axle, and the other, E, is fast and loose as circumstances may require, as follows:

$a$ is one part of a clutch, fast on the axle, the other part of said clutch, $b$, being formed on the inner part of the hub of the wheel E.

$c$ is a spring bearing against the outer side of the hub on which one-half of the clutch is formed, and holds into gear with the fixed half $a$, the projections or teeth of the clutch being so formed that when the machine is drawn forward both wheels revolve with the axle; but when the machine is turned round, the turning being almost invariably toward the cutters, said wheel E becomes loose from the clutch and turns on the axle, and thus facilitates the turning. Both wheels are therefore driving-wheels when the machine is cutting grain or grass, and besides the weight of the machine the weight of the driver is divided on the two wheels, and I thus avail myself of all the weight to throw friction on the driving-wheels to prevent them from slipping.

The wheel D is provided with cogs on the inner edge of its perimeter, which mesh with a pinion, F, on one end of the shaft $d$, and on the other end of said shaft $d$ is a cog bevel-wheel, G, working into a pinion, $e$, on the shaft $f$, and to a crank on the lower end of this shaft $f$ is fastened one end of the rod $g$, the other end being attached to the cutter-blade $h$ to vibrate it. The cutter-blade $h$ works under guides $i$ at its rear, and is protected by fingers $j$ in front.

The cutter-bar is composed of two pieces, H I, united together by bolts passing through a lap of their adjoining ends. The half H sustains the draft of the cutters and bar, and the half I, carrying the cutter-blade, fingers, &c., drags along on the ground. The object in making them of two pieces is that if one should get broken or wear out it could be replaced without removing the other half. The cutter-bar H I, thus made, is hung to the main frame by two rods, $k$ $k$, hooked into dead-eyes $l$ in the front cross-piece B, and extending back to the rear of the frame, where they are similarly hooked to the cutter-bar. By this manner of hanging the cutter-bar it is free to rise and fall to every projection or depression on the surface of the ground, and that, too, without regard to the rising or falling of the frame of the machine as the wheels mount over or run into uneven places. These two rods $k$ would not, however, prevent the cutter-bar from moving laterally, and to prevent any lateral motion I use another bar, $m$, hooked into a suspended piece, J, at one end, and to the cutter-bar at $n$ by its other end. This keeps the cutter-bar always right in its lateral position without preventing said cutter-bar from rising and falling as it conforms to the undulations of the ground or in passing over a stone or other impediment.

K is the driver's seat. It is connected to the supports $o$ $o$, which run from front to near the rear of the frame, by loops $p$ $p$, so that the driver may, without rising from his seat and by simply using his feet, move it forward or back, so that his weight may be used to balance the machine and throw the cutters into or out of the grass.

To a standard, L, on the right-hand longitudinal piece A, is hung a lever, M, to the rear end of which is hung by a chain, N, the cutter-bar H I, at about its center.

Near the front end of the lever M, which is provided with a handle, $r$, and a spring-catch, $s$, is an upright piece, O, supported in the frame and provided with any suitable number of notches, $t$, into which the spring-catch $s$ will drop when it is released from the hand of the driver. By means of this lever M the driver can raise or hold up the cutter-bar and cutters when it is desirable to raise them for any purpose.

P is the tongue, centrally placed on the frame or between the wheels, so as to put the horses near the center of the line of draft.

A seat for the driver, which was susceptible of adjustment, has been used; but this seat, when adjusted, was permanent, and consequently the driver could not move himself forward and back as the exigencies of the case might require—as, for instance, when working on ascending or descending ground, or in light or heavy grass, all of which may occur within a few rods—and if the machine must be stopped to make separate adjustments for these contingencies, he would be doing little else. By my mode of arranging the seat the driver may aid the machine by shifting his weight at any time as occasion may require.

Having thus fully described the nature of my invention, I would state that adjustable seats, or seats which can be adjusted, have been used; but to do this the machine must be stopped, and the adjustment, when made, is permanent. This I do not claim; but

What I do claim as of my invention, and desire to secure by Letters Patent, is—

1. The hanging of the cutter-bar to the main frame by means of the longitudinal rods $k$ and transverse rod $m$, so that said cutter-bar may be free to rise and fall to the undulations of the ground, while it is prevented from all lateral motion, substantially as described.

2. The use of a driver's seat when mounted on ways or rails so that the driver can at pleasure throw his weight forward or backward to aid in balancing the machine or in holding or relieving the cutters as the variable character of the ground or condition of the grass may require, as described.

JONATHAN HAINES.

Witnesses:
THOMAS H. UPPERMAN,
EMIL COHEN.